United States Patent
Schubert et al.

(10) Patent No.: US 11,900,026 B1
(45) Date of Patent: Feb. 13, 2024

(54) LEARNED FABRICATION CONSTRAINTS FOR OPTIMIZING PHYSICAL DEVICES

(71) Applicant: X Development LLC, Mountain View, CA (US)

(72) Inventors: Martin Schubert, Mountain View, CA (US); Brian Adolf, San Mateo, CA (US); Jesse Lu, Hollister, CA (US)

(73) Assignee: X Development LLC, Mountain View, CA (US)

( * ) Notice: Subject to any disclaimer, the term of this patent is extended or adjusted under 35 U.S.C. 154(b) by 603 days.

(21) Appl. No.: 16/393,654

(22) Filed: Apr. 24, 2019

(51) Int. Cl.
| | |
|---|---|
| *G06F 30/20* | (2020.01) |
| *G06N 3/084* | (2023.01) |
| *G06N 3/045* | (2023.01) |
| *G06F 30/27* | (2020.01) |
| *G06F 30/23* | (2020.01) |
| *G06F 111/04* | (2020.01) |
| *G06F 119/18* | (2020.01) |
| *G06F 119/22* | (2020.01) |
| *G02B 5/02* | (2006.01) |

(52) U.S. Cl.
CPC ............. *G06F 30/20* (2020.01); *G06N 3/045* (2023.01); *G06N 3/084* (2013.01); *G02B 5/0268* (2013.01); *G06F 30/23* (2020.01); *G06F 30/27* (2020.01); *G06F 2111/04* (2020.01); *G06F 2119/18* (2020.01); *G06F 2119/22* (2020.01); *Y02P 90/02* (2015.11)

(58) Field of Classification Search
CPC ....... G06F 30/36; G06F 30/20; G06N 3/0454; G06N 3/084
See application file for complete search history.

(56) References Cited

U.S. PATENT DOCUMENTS

| | | |
|---|---|---|
| 5,774,693 A | 6/1998 | Hsu et al. |
| 6,718,291 B1 | 4/2004 | Shapiro et al. |
| (Continued) | | |

FOREIGN PATENT DOCUMENTS

| | | |
|---|---|---|
| WO | 2017/176370 A1 | 10/2017 |
| WO | 2017/223560 A1 | 12/2017 |
| WO | 2018/184187 A1 | 10/2018 |

OTHER PUBLICATIONS

Chen, R.T. et al., "Neural Ordinary Differential Equations", 32nd Conference on Neural Information Processing Systems (NIPS 2018), Oct. 22, 2018, 18 pages.

(Continued)

*Primary Examiner* — Akash Saxena
(74) *Attorney, Agent, or Firm* — CHRISTENSEN O'CONNOR JOHNSON KINDNESS PLLC (57) ABSTRACT

A computer-implemented method for modeling fabrication constraints of a fabrication process is described. The method includes receiving training data including pre-fabrication structures and post-fabrication, training a fabrication constraint model by optimizing parameters of the fabrication constraint model based on the training data to model the fabrication constraints of the fabrication process, receiving an input design corresponding to a physical device, and generating a fabricability metric of the input design via the fabrication constraint model. The fabricability metric is related to a probabilistic certainty that the input design is fabricable by the fabrication process determined by the fabrication constraint model.

16 Claims, 7 Drawing Sheets

(56) References Cited

U.S. PATENT DOCUMENTS

| | | | |
|---|---|---|---|
| 6,772,076 | B2 | 8/2004 | Yamamoto et al. |
| 6,807,536 | B2* | 10/2004 | Achlioptas ........... G06F 18/2135 |
| | | | 324/303 |
| 7,191,112 | B2* | 3/2007 | Demler ................... G06F 30/36 |
| | | | 703/14 |
| 7,653,890 | B2 | 1/2010 | Tsai et al. |
| 8,124,300 | B1* | 2/2012 | Singh ......................... G03F 1/72 |
| | | | 430/30 |
| 8,463,073 | B2* | 6/2013 | Ma ............................. G06T 7/40 |
| | | | 382/289 |
| 9,400,955 | B2* | 7/2016 | Garimella ............. G06N 20/00 |
| 9,589,757 | B1 | 3/2017 | Hannon et al. |
| 10,198,550 | B2* | 2/2019 | Lutich ..................... G06F 30/39 |
| 10,657,214 | B2* | 5/2020 | Banna ...................... G06N 5/04 |
| 10,699,055 | B2* | 6/2020 | Sha .......................... G06F 30/27 |
| 11,176,447 | B2* | 11/2021 | Lei .......................... G06N 3/063 |
| 11,238,190 | B1* | 2/2022 | Lu ............................ G06F 30/20 |
| 11,379,633 | B2* | 7/2022 | Adolf ...................... G06F 30/20 |
| 11,397,895 | B2* | 7/2022 | Lu ............................ G06F 30/00 |
| 11,574,084 | B1* | 2/2023 | Marusich ................ G06F 30/10 |
| 2004/0225483 | A1 | 11/2004 | Okoniewski et al. |
| 2006/0281199 | A1* | 12/2006 | Matsushita .......... G05B 23/024 |
| | | | 257/E21.525 |
| 2008/0077907 | A1* | 3/2008 | Kulkami ................... G03F 1/36 |
| | | | 716/53 |
| 2010/0312539 | A1 | 12/2010 | Yamagajo et al. |
| 2013/0310966 | A1* | 11/2013 | MacNaughton .... G03F 7/70525 |
| | | | 700/121 |
| 2014/0365188 | A1 | 12/2014 | Doerr |
| 2015/0234970 | A1* | 8/2015 | Inoue ........................ G03F 7/00 |
| | | | 716/54 |
| 2016/0012176 | A1 | 1/2016 | Liu et al. |
| 2016/0033765 | A1 | 2/2016 | Liu et al. |
| 2016/0174902 | A1 | 6/2016 | Georgescu et al. |
| 2016/0179577 | A1* | 6/2016 | Catthoor ................. G06F 9/505 |
| | | | 718/104 |
| 2017/0148226 | A1 | 5/2017 | Zhang et al. |
| 2017/0345140 | A1 | 11/2017 | Zhang et al. |
| 2017/0351952 | A1 | 12/2017 | Zhang et al. |
| 2018/0018757 | A1 | 1/2018 | Suzuki |
| 2018/0045953 | A1 | 2/2018 | Fan et al. |
| 2018/0075581 | A1 | 3/2018 | Shi et al. |
| 2018/0240011 | A1* | 8/2018 | Tan ........................... G06F 9/46 |
| 2019/0073586 | A1* | 3/2019 | Chen ...................... G06N 3/084 |
| 2019/0121928 | A1* | 4/2019 | Wu .......................... H01L 24/97 |
| 2019/0196449 | A1* | 6/2019 | Zhang ..................... G06T 19/20 |
| 2019/0257767 | A1* | 8/2019 | Shaubi ................... G06T 7/0004 |
| 2019/0279094 | A1* | 9/2019 | Baughman ............. G06N 3/084 |
| 2020/0004918 | A1* | 1/2020 | Sha ......................... G03F 7/705 |
| 2020/0110852 | A1* | 4/2020 | Banna .................... G06N 20/00 |
| 2020/0151286 | A1* | 5/2020 | Willis ...................... G06F 30/00 |
| 2020/0174380 | A1* | 6/2020 | Huang ................... G06F 30/398 |
| 2020/0174840 | A1* | 6/2020 | Zhao ...................... G06F 9/5011 |
| 2020/0184720 | A1* | 6/2020 | Liu ......................... G06N 3/0454 |
| 2020/0278604 | A1* | 9/2020 | Lo ........................ G03F 7/70666 |
| 2021/0072635 | A1* | 3/2021 | Ma ........................... G03F 7/705 |
| 2021/0158152 | A1* | 5/2021 | Myung ................... G06F 30/27 |
| 2021/0216697 | A1* | 7/2021 | Van Den Brink ........ G03F 1/36 |
| 2022/0083721 | A1* | 3/2022 | Pillai ..................... G06F 30/398 |
| 2022/0092239 | A1* | 3/2022 | Kim .......................... G06N 3/08 |
| 2023/0153510 | A1* | 5/2023 | Yang ..................... G06F 30/398 |
| | | | 716/52 |

OTHER PUBLICATIONS

Petykiewicz, J. et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.

Ying-Shou Lu, J., "Nanophotonic Computational Design", A Dissertation Submitted to the Department of Electrical Engineering and the Committee on Graduate Studies of Stanford University, Jun. 2013, 122 pages.

Piggott, A.Y., "Automated Design of Photonic Devices", A Dissertation Submitted to the Department of Electrical Engineering and the Committee on Graduate Studies of Stanford University, Jun. 2018, 112 pages.

Lu, J. et al., "Nanophotonic Computational Design", Optics Express, vol. 21, No. 11, Jun. 3, 2013, 17 pages.

Piggott, A. Y. et al., "Inverse Design and Implementation of a Wavelength Demultiplexing Grating Coupler", Scientific Reports, Nov. 27, 2014, 5 pages.

Piggott, A.Y. et al., "Inverse Design and Demonstration of a Compact and Broadband On-Chip Wavelength Demultiplexer", Nature Photonics, May 11, 2015, 5 pages.

Piggott, A.Y. et al., "Silicon Photonics: Design Approach to Integrated Photonics Explores Entire Space of Fabricable Devices", Laser Focus World, Aug. 13, 2018, 5 pages.

Piggott, A. Y. et al., "Fabrication-constrained Nanophotonic Inverse Design", Scientific Reports, May 11, 2017, 7 pages.

Su, L. et al., "Inverse Design and Demonstration of a Concept On-Chip Narrowband Three-Channel Wavelength Demultiplexer", ACS Photonics, Aug. 17, 2017, 6 pages.

Su, L. et al., Fully-Automated Optimization of Grating Couplers, Optics Express, vol. 26, No. 4m Feb. 2018, 12 pages.

Robinson, J.T., "First-Principle Derivation of Gain in High-Index-Contrast Waveguides", Optics Express, vol. 16, No. 21, Oct. 13, 2008, 11 pages.

Lalau-Keraly, C.M. et al., "Adjoint Shape Optimization Applied to Electromagnetic Design", Optical Society of America, 2013, 9 pages.

Odajima, W. et al., "Application Examples of Electromagnetic Wave Simulation Software 'Poynting' in Manufacturing Industry", Fujitsu Sci. Tech. vol 50, No. 3, Jul. 2014, 8 pages.

Isola, P. "Image-to-Image Translation with Conditional Adversarial Networks", arXiv:1611.07004, Nov. 2016, 17 pages.

Zhu, Jun-Yan et al., "Unpaired Image-to-Image Translation using Cycle-Consistent Adversarial Networks", arXiv:1703.10593 [cs.CV], Nov. 15, 2018, 18 pages.

Creswell, A. et al., "Generative Adversarial Networks: An Overview", IEEE-SPM, Apr. 2017, 14 pages.

Goodfellow, I. et al., "Generative Adversarial Nets", Advances in Neural Information Processing Systems 27 (NIPS), 2014, 9 pages.

Horvathm R. et al., "Analytical Theory of Grating Couplers for Waveguide Sensing: A Perturbational Approach and its Limitations", Applied Physics B 81(1), Jan. 2015, 32 pages.

Athena Process Simulation Framework, Retrieved from Internet: <www.Silvaco.com>, Dec. 2018, 4 pages.

Atlas—Device Simulation Framework, Retrieved from Internet: <www.Silvaco.com>, Dec. 2018, 16 pages.

"Discussion Today Grating Couplers", Berkeley University, EE232 Discussion, Feb. 16, 2017, 26 pages.

Hesse, C., "Image-to-Image Translation in Tensorflow", Retrieved from Internet: <https://affinelayer.com/pix2pix/>, Nov. 1, 2018, 11 pages.

Shrivastava, A. et al., "Learning from Simulated and Unsupervised Images through Adversarial Training", arXiv:1612.07828 [cs.CV], Jul. 19, 2017, 16 pages.

"3D Inviscid Inverse Design Code Applicable to All Types of Axial, Mixed Flow and Radial Turbomachinery", Retrieved from Internet: <https://www.adtechnology.com/technology/turbodesign-suite/turbodesign-1>, Dec. 2018, 2 pages.

Shibuya, N., "Understanding Generative Adversarial Networks", Retrieved from Internet: <https://towardsdatascience.com/understanding-generative-adversarial-networks-4dafc963f2ef>, Nov. 2, 2017, 11 pages.

Victory Process—3D Process Simulator, Retrieved from Internet: <https://www.silvaco.com/products/tcad/process_simulation/victory_process/victory_process.html>, Nov. 5, 2018, 5 pages.

Victory Process, Retrieved from Internet: <https://www.silvaco.com>, Dec. 2018, 12 pages.

Yi, Z. "DualGAN: Unsupervised Dual Learning for Image-to-Image Translation", arXiv:1704.02510 [cs.CV], Oct. 9, 2018, 9 pages.

* cited by examiner

705 — RECEIVING INPUT DESIGN OF PHYSICAL DEVICE CORRESPONDING TO INITIAL DESCRIPTION WITH ONE OR MORE STRUCTURAL PARAMETERS

710 — CONFIGURING PHYSICAL DEVICE SIMULATOR AND FABRICATION CONSTRAINT MODEL BASED ON INPUT DESIGN OF PHYSICAL DEVICE

715 — OUTPUT EXPECTED STRUCTURE AFTER FABRICATION BASED ON INPUT DESIGN VIA FABRICATION CONSTRAINT MODEL

720 — GENERATE REFINED DESIGN REPRESENTATIVE OF EXPECTED FABRICATION STRUCTURE VIA FABRICATION CONSTRAINT MODEL

725 — GENERATE FABRICABILITY METRIC OF INPUT DESIGN THAT IS PROBABILISTIC CERTAINTY THAT INPUT DESIGN IS FABRICABLE

730 — PERFORM SIMULATION OF PHYSICAL DEVICE OPERATING IN RESPONSE TO EXCITATION SOURCE TO DETERMINE PERFORMANCE METRIC

735 — DETERMINE LOSS METRIC OF INPUT DESIGN BASED, AT LEAST IN PART, ON PERFORMANCE METRIC AND FABRICABILITY METRIC

740 — PERFORM ADJOINT SIMULATION TO DETERMINE INFLUENCE OF CHANGES TO STRUCTURAL PARAMETERS ON PERF. AND FAB. METRICS

745 — GENERATING REVISED DESCRIPTION OF PHYSICAL DEVICE BY UPDATING STRUCTURAL PARAMETERS TO REDUCE LOSS METRIC

750 — LOSS METRIC CONVERGES? — NO (loop back to 715)

YES ↓

755 — OUTPUT OPTIMIZED PHYSICAL DEVICE

FIG. 7

LEARNED FABRICATION CONSTRAINTS FOR OPTIMIZING PHYSICAL DEVICES

TECHNICAL FIELD

This disclosure relates generally to design tools, and in particular but not exclusively, relates to design tools for optical and electromagnetic devices.

BACKGROUND INFORMATION

Electromagnetic devices (e.g., optical devices, electrical devices, or otherwise) are devices that create, manipulate, propagate, and/or measure electromagnetic radiation. Their applications vary broadly and include, but are not limited to, acousto-optic modulators, optical modulators, optical couplers, optical ring resonators, distributed Bragg reflectors, lasers, lenses, transistors, waveguides, antennas, and the like. Conventional techniques for the design of these devices are sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of electromagnetic devices is increased and manufacturing tolerances improve to allow for smaller device feature sizes, it becomes increasingly important to take full advantage of these improvements via optimized device design.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus, system, and method for optimizing physical characteristics of a physical device based, at least in part, on learned fabrication constraints are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are embodiments of a physical device simulator including a fabrication constraint model to optimize structural parameters of physical devices based on first-principles simulations while also taking into account the fabrication constraints of a fabrication process that may be used to manufacture the physical device. The physical device simulator allows for a first-principles based design and optimization of devices based on their optical, electrical, magnetic, acoustic, and/or fluidic response (e.g., field response) to an excitation source. More specifically, the physical device simulator utilizes partial-differential equation (PDE) systems to model the physical response (i.e., field response) of the physical device operating in response to an excitation source for simulating operation (e.g., operational simulation) of the physical device. Based on the simulation, one or more performance metrics related to a loss metric of the physical device may be characterized and subsequently utilized to perform an adjoint simulation to determine how changes in the structural parameters of the physical device influences the loss metric. A revised description of the physical device may subsequently be generated by updating the structural parameters to reduce the loss metric. Performing the operational simulation, adjoint simulation, and generating a revised description may be iteratively performed to optimize the design of the physical device via various gradient-based techniques (e.g., gradient descent, variants thereof, and the like).

However, while first-principles simulations are advantageously used to update the structural parameters of the physical device (e.g., to reduce the loss metric and increase the performance metric), it is additionally important to take into account fabrication constraints of the fabrication process utilized to manufacture the physical device. Moreover, incorporation of fabrication constraints in physical device optimization is critical when high yield and manufacturability is of concern. This is particularly true in domains ranging from photonics (e.g., when designing grating couplers), electronics (e.g., when designing the dielectrics for a field-effect transistor), and structural mechanics (e.g., when designing infill for a lightweight solid). One or more fabrication techniques may be included in a fabrication process for manufacturing a physical device. For example, manufacturing an electromagnetic device such as a field-effect transistor may include various fabrication techniques such as focused ion beam, lithography, physical and/or chemical vapor deposition, chemical mechanical planarization, and other additive or subtractive manufacturing techniques. Thus, it is important to develop a fabrication constraint model which takes into account the fabrication constraints of the fabrication process used to fabricate a physical device being optimized.

Given a fabrication process, fabrication constraints may be modeled by forming a variety of test structures. The test structures may then be characterized to determine the fidelity with respect to the original design, the reproducibility of a particular structure, etc. From these results, a set of rules may be developed that might include, for example, minimum thickness of a deposited layer, minimum linewidth for lithographically formed linear features, minimum diameter for circular features, and the like. However, translating these rules into differentiable expressions (e.g., for use with gradient-based optimization techniques) to enable scoring of arbitrary device designs is challenging, and in general these expressions may have limited accuracy proximate to the boundaries of fabrication capabilities of the fabrication process. In other words, by genericizing the fabrication constraints of a fabrication process to a fixed set of rules, the capabilities of a particular fabrication technique or process may not be fully captured, which may ultimately result in compromised device performance since the best performance is often achieved by exploiting the full potential of a fabrication process. Additionally, a set of rules does not necessarily capture the distribution of the variations within a fabrication process, as well as the interdependencies that affect these distributions (e.g., how an etching step may change based on the previous steps performed on the wafer).

Described herein are embodiments of a differentiable model for describing fabrication constraints of a fabrication process. More specifically, methods of operating and training a fabrication constraint model are described in various embodiments of the disclosure. In one embodiment, a neural network configured as a generative adversarial network (GAN) is used to model the fabrication constraints of a fabrication process. The GAN may include a discriminator which may be trained to distinguish between structures that can be fabricated and those which cannot. Furthermore, because the neural network is differentiable, the discriminator may be utilized as a differentiable fabrication constraint model for use in gradient-based optimization schemes, in accordance with embodiments of the disclosure. Advantageously, such embodiments may be utilized to make designs, traditionally considered unmanufacturable, manufacturable and/or generate designs with improved yield. In the same or other embodiments, the discriminator may be trained to assign a certainty of its output (e.g., its prediction of fabricability) as a fabricability metric. In some embodiments, training of the GAN may be augmented by fabricating test structures where the discriminator certainty is low to perform secondary training to further optimize the parameter of the discriminator to model the fabrication constraints of the fabrication process. In another embodiment, the training data may be utilized to train a neural network to generate a design (i.e., pre-fabrication structure) given a target structure (i.e., post-fabrication structure).

Figure 1:
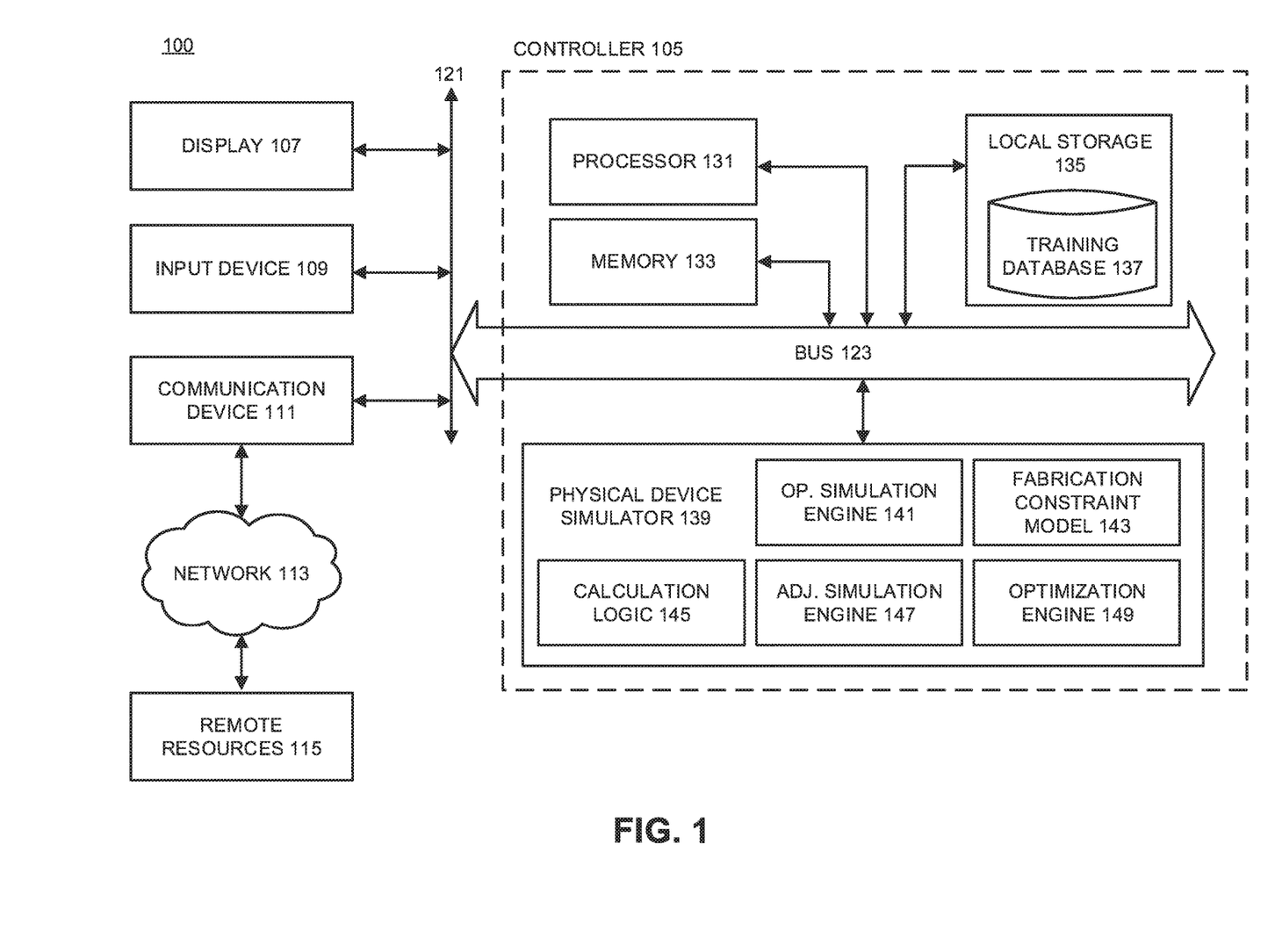
FIG. 1 is a block diagram illustrating a system for optimizing structural parameters of a physical device based, at least in part, on fabrication constraints, in accordance with an embodiment of the present disclosure.

FIG. 1 is a block diagram illustrating a system 100 for optimizing structural parameters of a physical device based, at least in part, on fabrication constraints, in accordance with an embodiment of the present disclosure. In the following embodiments, system 100 will be described in the context of an optical waveguide as corresponding to the physical device. However, it is appreciated that the physical device is not limited to optical waveguides and that other devices such as optical and electromagnetic devices (e.g., acousto-optic modulators, optical modulators, optical couplers, optical ring resonators, distributed Bragg reflectors, lasers, lenses, transistors, waveguides, antennas, optoelectronic switches, grating couplers, and the like), mechanical structures, and the like may be represented by the term "physical device." More specifically, system 100 provides first-principles based design and optimization of devices based on their optical, electrical, magnetic, acoustic, and/or fluidic response (e.g., field response) to an excitation source. In other words, it is appreciated that system 100 is not limited to modeling optical waveguides, and that other devices having a field response to an excitation source may also be modeled and subsequently have structural parameters optimized while also taking in account fabrication constraints of a fabrication process used to fabricate the device.

As illustrated, system 100 includes controller 105, display 107, input device(s) 109, communication device(s) 111, network 113, remote resources 115, bus 121 and bus 123. Controller 105 includes processor 131, memory 133, local storage 135, and physical device simulator 139. Local storage 135 includes training database 137. Physical device simulator 139 includes operational simulation engine 141, fabrication constraint model 143, calculation logic 145, adjoint simulation engine 147, and optimization engine 149. It is appreciated that in some embodiments, controller 105 may be a distributed system.

Controller 105 is coupled to display 107 (e.g., a light emitting diode display, a liquid crystal display, and the like) coupled to bus 121 through bus 123 for displaying information to a user utilizing system 100 to optimize structural parameters of the physical device based, at least in part, on fabrication constraints of a fabrication process. Input device 109 is coupled to bus 121 through bus 123 for communicating information and command selections to processor 131. Input device 109 may include a mouse, trackball, keyboard, stylus, or other computer peripheral, to facilitate an interaction between the user and controller 105. In response, controller 105 may provide verification of the interaction through display 107.

Another device, which may optionally be coupled to controller 105, is a communication device 111 for accessing remote resources 115 of a distributed system via network 113. Communication device 111 may include any of a number of networking peripheral device such as those used for coupling to an Ethernet, Internet, wide area network, and the like. Communication device 111 may further include connectivity between controller 105 and the outside world. Note that any or all of the components of system 100 illustrated in FIG. 1 and associated hardware may be used in various embodiments of the present disclosure. The remote resources 115 may be part of a distributed system and include any number of processors, memory, and other resources for optimizing the structural parameters of the physical device.

Controller 105 orchestrates operation of system 100 for optimizing the structural parameters of the physical device based, at least in part, on fabrication constraints of a fabrication process. Processor 131 (e.g., one or more central processing units, graphics processing units, and/or tensor processing units, etc.), memory 133 (e.g., volatile memory such as DRAM and SRAM, non-volatile memory such as ROM, flash memory, and the like), local storage 135 (e.g., magnetic memory such as computer disk drives), and the physical device simulator 139 are coupled to each other through bus 123. Local storage 135 includes training database 137 which may include pre-training data, training data, and secondary training data for training fabrication constraint model 143 to model fabrication constraints of a fabrication process for fabricating a physical device. Controller 105 includes software (e.g., instructions included in memory 133 coupled to processor 131) and/or hardware logic (e.g., application specific integrated circuits, field-programmable gate arrays, and the like) that when executed by controller 105 causes the controller 105 or the system 100 to perform operations. The operations may be based on instructions stored within any one of, or a combination of, memory 133, local storage 135, physical device simulator 139, and remote resources 115 accessed through network 113.

In the illustrated embodiment, the modules 141-149 of physical device simulator 139 are utilized to optimize structural parameters of the physical device (e.g., the optical waveguide) based, at least in part, on fabrication constraints of a fabrication process to fabricate the physical device. In some embodiments, system 100 may optimize structural parameters of the physical device via, inter alia, simulations (e.g., operational and adjoint simulations) that utilize a finite-difference time-domain (FDTD) method to model the field response (e.g., both electric and magnetic fields). The operational simulation engine 141 provides instructions for performing a simulation of the physical device operating in response to an excitation source within a simulated environment. In particular, the operational simulation determines a field response of the physical device in response to the excitation source for determining a performance metric of the physical device (e.g., based off of an initial input design of the physical device and the excitation source). Fabrication constraint model 143 is used to model fabrication constraints of a fabrication process used to fabricate the physical device. More specifically, fabrication constraint model 143 may generate a fabricability metric of the input design of the physical device that is related to a probabilistic certainty that the input design is fabricable by the fabrication process. Calculation logic 145 computes a loss metric of the input design based, at least in part, on the performance metric and the fabricability metric. Adjoint simulation engine 147 is utilized in conjunction with operational simulation engine 141 to perform an adjoint simulation of the physical device to backpropagate the loss metric through the simulated environment to determine how changes in the structural parameters of the physical device influence the loss metric. Optimization engine 149 is utilized to update the structural parameters of the physical device to reduce the loss metric and generate a revised description of the physical device.

Figure 2A:
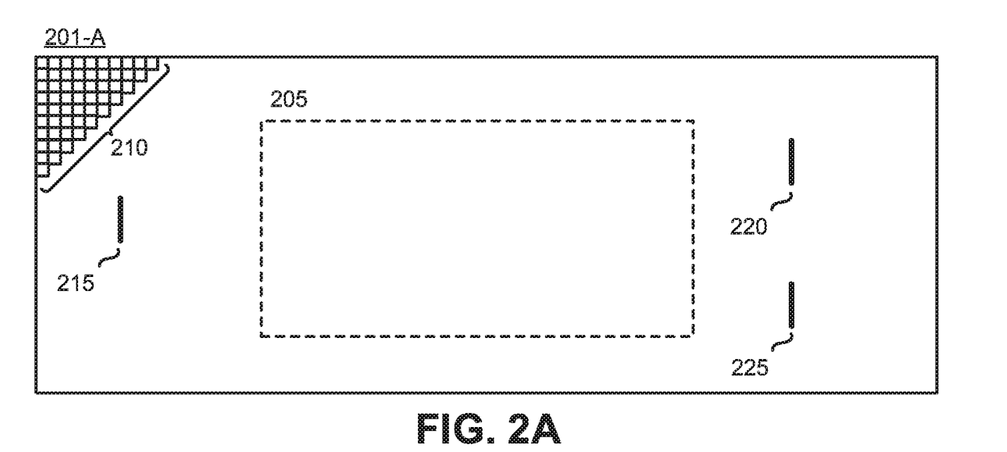
FIGS. 2A-2C respectively illustrate an initial set up of a simulated environment describing a physical device, performing an operational simulation of the physical device operating in response to an excitation source within the simulated environment, and performing an adjoint simulation of the physical device within the simulated environment, in accordance with embodiments of the present disclosure.
Figure 2B:
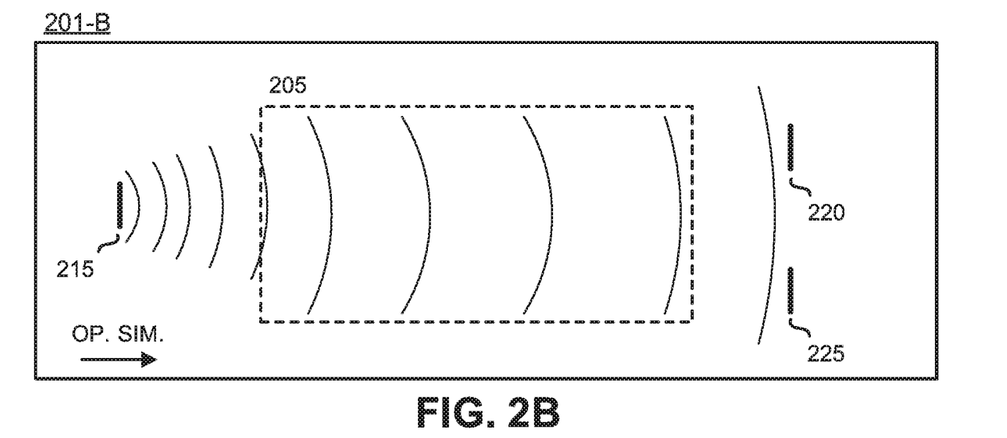
Figure 2C:
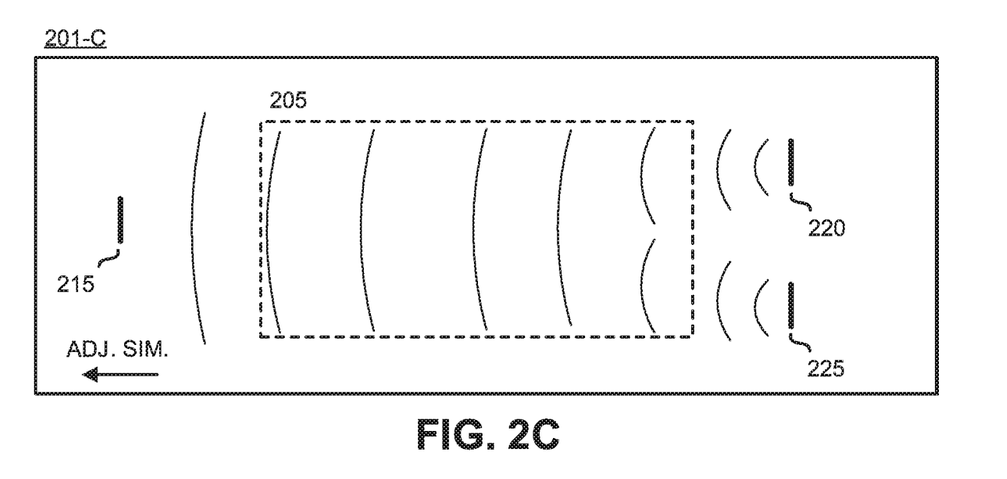

FIGS. 2A-2C respectively illustrate an initial set up of a simulated environment 201-A describing a physical device, performing an operational simulation of the device operating in response to an excitation source within the simulated environment 201-B, and performing an adjoint simulation of the physical device within the simulated environment 201-C, in accordance with embodiments of the present disclosure. The initial set up of the simulated environment, operational simulation, and adjoint simulation may be implemented with system 100 illustrated in FIG. 1. As illustrated in FIGS. 2A-2C, simulated environment 201 is represented in two-dimensions, however it is appreciated that higher (e.g., 3-dimensional space) and lower (e.g., 1-dimensional space) dimensionality may also be used to describe simulated environment 201 and the physical device. In some embodiments, optimization of structural parameters of the physical device illustrated in FIGS. 2A-2C may be achieved via, inter alia, simulations (e.g., operational simulations and adjoint simulations) that utilize a finite-difference time-domain (FDTD) method to model the field response (e.g., electric and magnetic field) to an excitation source and a fabrication constraint model to model the fabrication constraints of the fabrication process to fabricate the physical device.

FIG. 2A illustrates an example rendering of a simulated environment 201-A describing an optical waveguide (i.e., a physical device), in accordance with an embodiment of the present disclosure. More specifically, in response to receiving an initial description of a physical device defined by one or more structural parameters (e.g., an input design), a system (e.g., system 100 of FIG. 1) configures a simulated environment 201 to be representative of the physical device. As illustrated, the simulated environment 201 (and subsequently the physical device) is described by a plurality of voxels 210, which represent individual elements of the two-dimensional (or three-dimensional) space of the simulated environment 201. Each of the voxels is illustrated as two-dimensional squares; however, it is appreciated that the voxels may be represented as cubes or other shapes in three-dimensional space. It is appreciated that the specific shape and dimensionality of the plurality of voxels 210 may be adjusted dependent on the simulated environment 201 and physical device being simulated. It is further noted that only a portion of the plurality of voxels 210 are illustrated to avoid obscuring other aspects of the simulated environment 201.

Each of the plurality of voxels 210 is associated with at least a structural value, a field value, and a source value. Collectively the structural values of the simulated environment describe the structural parameters of the physical device. In one embodiment, the structural values may correspond to a relative permittivity, permeability, and/or refractive index that collectively describe structural (i.e., material) boundaries of the physical device. For example, an interface where the relative permittivity changes may define a boundary of the physical device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic field at a particular time step for each of the plurality of voxels 210. More specifically, the vector may correspond to a Yee lattice to discretize Maxwell's equations for determining the field response. Thus, the field response may be based, at least in part, on the structural parameters of the physical device and the excitation source 215.

In the illustrated embodiment, the physical device corresponds to an optical waveguide having a design region 205, in which structural parameters of the physical device may be updated. The simulated environment 201 may include an input port 215 of the physical device in which an excitation source (e.g., a Gaussian pulse, a wave, a waveguide mode response, and the like) originates and is positioned to propagate through the design region 205 towards output ports 220 and 225 of the physical device. The electric and magnetic fields within the simulated environment 201 (and subsequently the physical device) may change (e.g., field response) in response to the excitation source. The output ports 220 and 225 of the optical waveguide may be used for determining a performance metric of the physical device in response to the excitation source. The initial description of the physical device, including initial structural parameters, excitation source, performance parameters or metrics, and other parameters describing the physical device, are received by the system (e.g., system 100 of FIG. 1) and used to configure the simulated environment for performing a first-principles based simulation of the physical device. These specific values and parameters may be defined directly by a user (e.g., of system 100 in FIG. 1), indirectly (e.g., via controller 105 culling pre-determined values stored in memory 133, local storage 135, or remote resources 115), or a combination thereof.

FIG. 2B illustrates an example operational simulation of the physical device (e.g., the optical waveguide) in the simulated environment 201-B, in accordance with an embodiment of the present disclosure. The rendered simulated environment 201-B represents a particular time step when performing an operational simulation of the physical device operating in response to an excitation source (e.g., electromagnetic waves originating at the input source 215 that propagates through the simulated environment 201). In one embodiment, the physical device is an optical waveguide operating at the frequency of interest and having a particular waveguide mode (e.g., transverse electric, transverse magnetic, transverse electric and magnetic modes) and the excitation source is at an input of the optical waveguide having a specified spatial, phase, and/or temporal profile. The operational simulation occurs over a plurality of time steps, including the illustrated time step. When performing the operational simulation, changes to the field response (e.g., the field value) for each of the plurality of voxels 210 are updated in response to the excitation source and based, at least in part, on the structural parameters of the physical device at each of the plurality of time steps. Similarly, in some embodiments the source value is updated for each of the plurality of voxels (e.g., in response to the electromagnetic waves from the excitation source 215 propagating through the simulated environment). It is appreciated that the operational simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

Once the operational simulation reaches a steady state (e.g., changes to the field values in response to the excitation source stabilize or reduce to negligible values) or otherwise concludes, one or more performance metrics may be determined. In some embodiments, the excitation source of the operational simulation may comprise a pulse. In such a scenario, the operational simulation may conclude once the intensity of the pulse has substantially dissipated. In other embodiments, the performance metric may be ascertained without waiting for the excitation source to dissipate. In the same or other embodiments the operational simulation may be considered to have reached a steady state once the field values reach a null value. In one embodiment, the performance metric corresponds to the output mode of the optical waveguide at output ports 220 and 225. In the same or other embodiments, the performance parameter represents power (at one or more frequencies of interest) in the target mode shape at the specific locations of the output ports 220 and 225. Additionally, before, during, or after the operational simulation, the input design may be input into a fabrication constraint model (e.g., fabrication constraint model 143 illustrated in FIG. 1), which models a fabricability of the input design using a fabrication process, to determine a fabricability metric. A loss metric of the input design based, at least in part, on the performance metric and the fabricability metric may be determined. In one embodiment, the loss metric may correspond to the fabricability metric (e.g., a value between 0 and 1 representative, where 0 corresponds to not fabricable and 1 represents fabricable) multiplied or otherwise summed with a difference between the performance metric and a target performance value. In other words, the loss metric is tied both to performance of the physical device as well as fabricability of the input design.

FIG. 2C illustrates an example adjoint simulation of the physical device in which the loss metric is backpropagated within the simulated environment 201-C, in accordance with an embodiment of the present disclosure. More specifically, the adjoint simulation is utilized in combination with the operational simulation to determine how changes in the structural parameters of the physical device influence the loss metric. In some embodiments, the adjoint simulation is performed by backpropagating the loss metric (e.g., a time-reverse simulation) through the simulated environment 201. In other words, an adjoint (or virtual) source based on the loss metric is placed at the waveguide output ports 220 and 225 and acts as an excitation source during the adjoint simulation. A loss response (e.g., electric or magnetic field) is computed via the adjoint simulation in which the loss response at each of the plurality of voxels is incrementally updated in response to the adjoint source. The change in the loss response based on the loss metric corresponds to a loss gradient that may be combined with the field gradient (e.g., change in the field response with respect to the excitation source) to determine a structural gradient of the physical device. The structural gradient is indicative of how changes in the structural parameters of the physical device influence the loss metric. In other words, the structural parameters may be updated to reduce the loss metric and generate a revised description of the physical device. Since the loss metric is based on both the performance metric and the fabricability metric, the revised description takes into account both the fabricability of the design as well as the performance.

In some embodiments, iterative cycles of the operational simulation and adjoint simulation are performed successively using an optimization scheme such as gradient descent to adjust the structural parameters of the physical device to reduce the loss metric. More specifically, after each cycle the structural parameters are updated (e.g., optimized) to reduce the loss metric. The operational simulation, adjoint simulation, and updating the structural parameters are repeated successively until the loss metric substantially converges such that the loss metric is below (or between) a threshold value or values. In other words, the design of the physical device is optimized for both performance and fabricability. In some embodiments, the loss metric is iteratively reduced (and structural parameters updated/optimized) via a gradient descent algorithm, or some other optimization scheme. Since the loss metric is tied specifically to the fabricability metric, and the fabrication constraint model (e.g., fabrication constraint model 143 illustrated in FIG. 1) is a differentiable model, the structural gradients determined, in part, via the adjoint simulation also takes into account how changes in the structural parameters influence the loss metric in relation to the fabricability metric. In other words, changes to the structural parameters that are not feasible (or significantly negatively influence manufacturing yield) are penalized in a manner similar to how changes to the structural parameters that negatively influence the performance of the physical device are penalized when updating the structural parameters of the physical device. This may mitigate the optimization of the structural parameters from suggesting refined designs that are not feasible from a manufacturing perspective (e.g., aspect ratio of a geometric boundary is too sharp to be manufactured) or otherwise result in a significantly reduced yield (e.g., device yield becomes lower than a threshold value). Succinctly, manufacturing yield of the physical devices may be optimized in embodiments of the disclosure.

FIGS. 3A-3D respectively illustrate a fabrication model 304, an inverse fabrication model 308, and two variants of fabrication constraint models 343 and 353 for modeling fabrication constraints of a fabrication process, in accordance with embodiments of the present disclosure. Fabrication model 304, inverse fabrication model 308, fabrication constraint model 343, and/or fabrication constraint model 353 are possible implementations of fabrication constraint model 143 illustrated in FIG. 1.

Figure 3A:
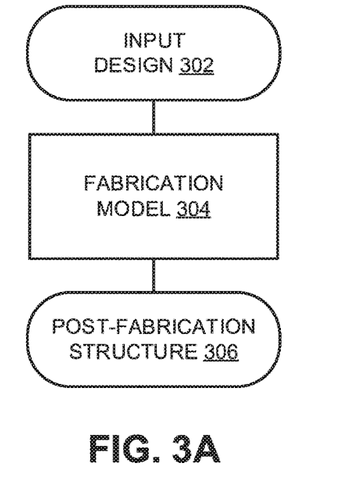
FIGS. 3A-3D respectively illustrate a fabrication model, an inverse fabrication model, and two variants of fabrication constraint models for modeling fabrication constraints of a fabrication process, in accordance with embodiments of the present disclosure.

As illustrated in FIG. 3A, fabrication model 304 may receive an input design 302 representative of a physical device. More specifically, the input design 302 may correspond to a pre-fabrication structure (i.e., a target design or other graphical representation of the physical device that may take into account fabrication limitations of a fabrication process as determined by a fabrication constraint model). For example, the input design 302 may be a computer aided design (CAD) file or other graphical representation of the physical device that may be fabricated by a particular fabrication process (e.g., lithography). In response to receiving input design 302, fabrication model 304 outputs a post-fabrication structure 306 which corresponds to an expected fabrication structure of input design 302 when the input design 302 is fabricated by the fabrication process. In some embodiments, the post-fabrication structure 306 corresponds to an image (or other data type) of the physical device fabricated by the fabrication process. In other words, fabrication model 304 may intrinsically model the fabrication constraints of the fabrication process. In one embodiment, fabrication model 304 is a neural network (e.g., feed-forward deep neural network) that is trained via training data that includes input designs that are physically fabricated by the fabrication process and subsequently imaged (e.g., via a scanning electron microscope, transmission electron microscope, x-ray diffraction, and/or other imaging techniques). Accordingly, the output of fabrication model 304 may resemble the imaging technique (e.g., scanning electron microscope) used to image the fabricated structures. In other embodiments, fabrication model 304 may include a numerical simulation software package that generates simulated images corresponding to the expected fabrication structure (i.e., post fabrication structure 306) of the input design 302. In the same or other embodiments, the simulated images and the images of physically fabricated structures may be used in combination for training fabrication model 304 and/or inverse fabrication model 308.

Figure 3B:
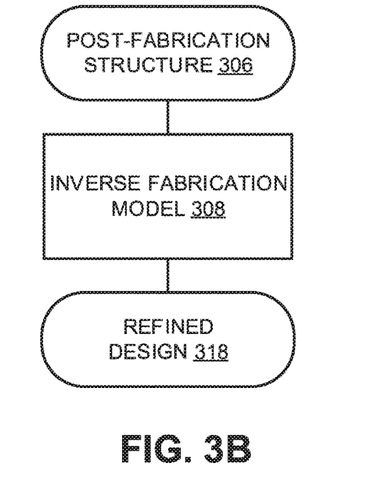

In the illustrated embodiment of FIG. 3B, post-fabrication structure 306 output by fabrication model 304 is input into inverse fabrication model 308 to generate a refined design 318 of the input design 302. In other words, inverse fabrication model 308 receives an expected fabrication structure (i.e., post-fabrication structure 306, which may include an image of a fabricated structure and/or a simulated image representative of a fabricated structure) and generates a refined design (e.g., CAD file or other graphical representation) representative of the expected fabrication structure. In one embodiment, the inverse fabrication model 308 may include a deep neural network such as a generative adversarial network (GAN).

Figure 3C:
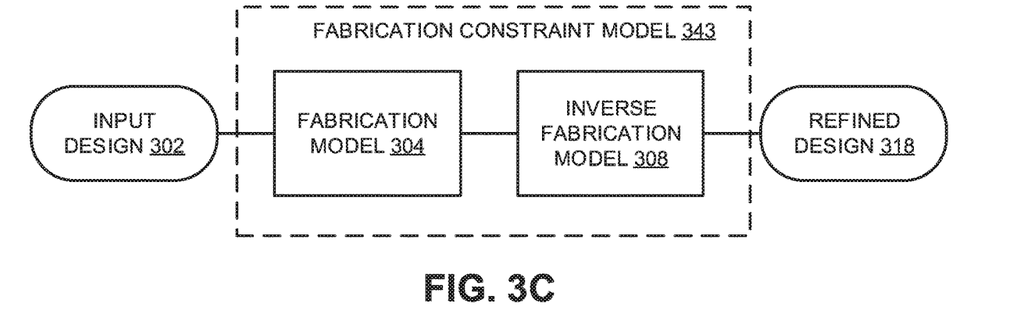

In the illustrated embodiment of FIG. 3C, the fabrication model 304 and the inverse fabrication model 308 may be coupled together (e.g., output of fabrication model 304 coupled to the input of inverse fabrication model 308) to form a fabrication constraint model 343, which is one possible implementation of fabrication constraint model 143 illustrated in FIG. 1. As illustrated in FIG. 3C, fabrication constraint model 343 receives an input design 302 (e.g., representative of a pre-fabrication structure) and subsequently outputs a refined design 318 (e.g., representative of a post-fabrication structure or expected fabrication structure). In other words, the refined design 318 may be more representative of the manufacturing output (i.e., the actual device after fabrication) relative to the input design 302. Thus, the refined design 318 provides an improved representation of the manufacturing tolerances and/or limitations. In some embodiments, the input design 302 and the refined design 318 may be compared to determine a fabricability metric of the input design 302. For example, a comparison algorithm (e.g., scale-invariant feature transform, and the like) may be used to score or otherwise quantify the differences in a differentiable manner that may be tied to a loss function or metric for use in the gradient-based optimization techniques described in the various embodiments of the disclosure.

Figure 3D:
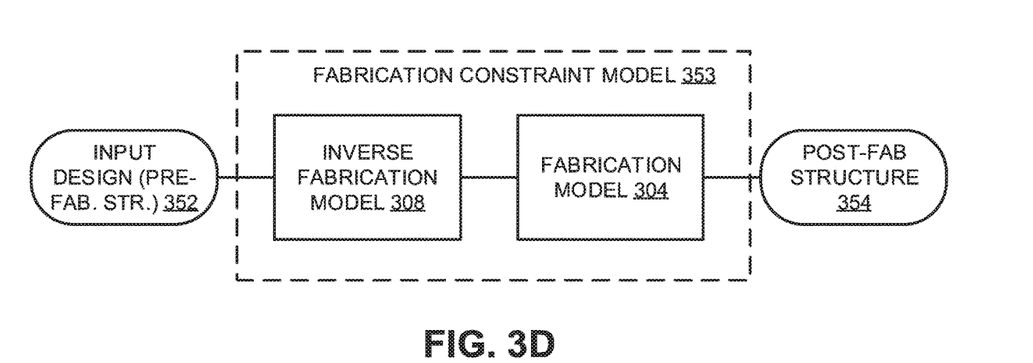

In the illustrated embodiment of FIG. 3D, inverse fabrication model 308 and fabrication model 304 may be coupled together (e.g., output of inverse fabrication model 308 is coupled to the input of fabrication model 304) to form fabrication constraint model 353, which is one possible implementation of fabrication constraint model 143 illustrated in FIG. 1. As illustrated in FIG. 3D, an input design (e.g., a pre-fabrication structure that may represent structural parameters corresponding to a design or structure of a physical device) is input into inverse fabrication model 308 to be optimized. Subsequently, inverse fabrication model 308 performs operational and adjoint simulations to update the structural parameters of the physical device to reduce a loss metric that is tied to a performance metric of the physical device. Inverse fabrication model 308 may then output a refined design or structure (e.g., a revised description) with the updated structural parameters. The updated structural parameters may then be input into fabrication model 304, which outputs post-fabrication structure 354 which corresponds to an expected structure when the pre-fabrication structure (e.g., input design 352) is fabricated by a fabrication process. The difference between input design 352 and post-fabrication structure 354 may be determined (e.g., by comparing structural parameters) to determine a fabricability metric for use in the gradient based optimization techniques described in the various embodiments of the disclosure. It is appreciated that in some embodiments, the inverse fabrication model 308 may include models and/or deep neural networks coupled together. For example, a model for performing the operational and adjoint simulations may be separate from the model that generates the refined design, but both may be collectively considered part of inverse fabrication model 308.

Figure 4A:
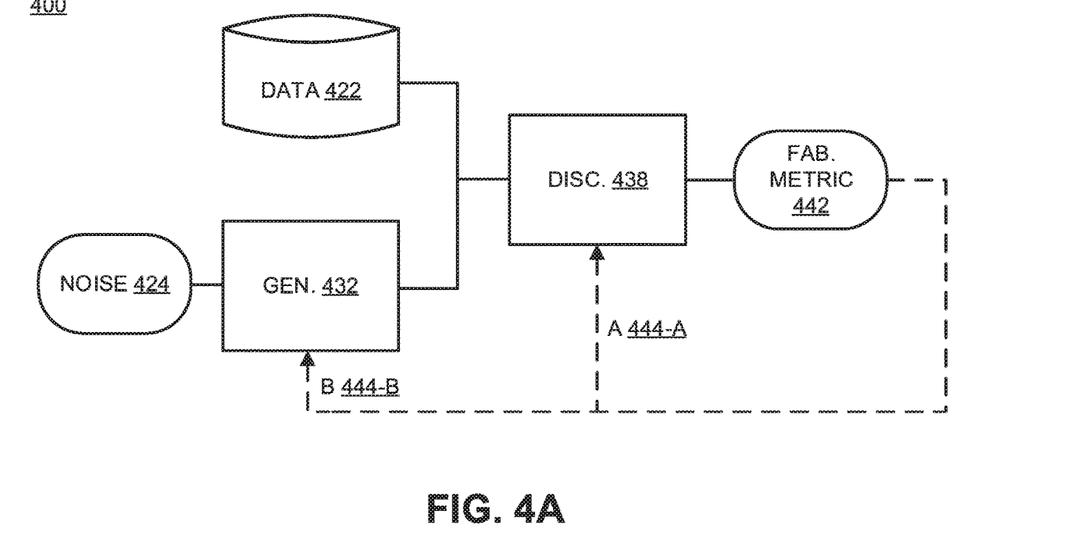
FIG. 4A is a block diagram illustrating an adversarial generative neural network, which may be part of a fabrication constraint model, for modeling fabrication constraints of a fabrication process, in accordance with an embodiment of the present disclosure.

FIG. 4A is a functional block diagram illustrating a generative-adversarial network (GAN) 400, which may be part of a fabrication constraint model, for modeling fabrication constraints of a fabrication process, in accordance with an embodiment of the present disclosure. GAN 400 may be included in a fabrication constraint model (e.g., fabrication constraint model 143 of FIG. 1), and in some embodiments, may correspond to an inverse fabrication model (e.g., inverse fabrication model illustrated in FIG. 3B) for modeling fabrication constraints of a fabrication process. GAN 400 includes a discriminator 438 and a generator 432, which are each deep neural networks (e.g., convolutional neural networks). Succinctly, generator 432 and discriminator 438 are trained alternately via an adversarial loss. More specifically, the generator 432 tries to generate images (or data) in response to receiving noise 424 (e.g., random noise vector) as an input that are indistinguishable from the training data 422 by the discriminator 438. The discriminator 438, on the other hand, is a classifier trained to distinguish between images generated by generator 432 and the training data 422. As illustrated, the discriminator 438 outputs a fabricability metric 442, which may be used as a loss value to alternately train discriminator 438 and generator 432 by passing the loss value along path 444-A or 444-B, respectively. It is noted that parameters of the generator 432 are held constant while the discriminator 438 is being trained. Similarly, parameters of the discriminator 438 are held constant while the generator 432 is being trained. In other embodiments, the discriminator 438 and generator 432 may be trained simultaneously. The parameters may correspond to weights and/or biases between nodes of the neural network representative of GAN 400.

In the illustrated embodiment, discriminator 438 outputs a fabricability metric 442 based on an input (e.g., the generated images from generator 432). In some embodiments, GAN 400 is a conditional GAN and the training data 422 is paired (or unpaired) and includes fabricable structures and non-fabricable structures with a fabrication process. The conditional GAN may receive a labeled reference input (e.g., labeled as fabricable or not fabricable) in addition to noise 424, such that generator 432 tries to generate images that look comparable to fabricable or non-fabricable structures, with the discriminator 438 trained to distinguish the same. Thus, in some embodiments, the discriminator 438 is trained to output a classification of an input design as fabricable or not fabricable with the fabrication process, which may be used to generate (or otherwise correspond to) a fabricability metric. The fabricability metric being related to a probabilistic certainty that the input design is fabricable (or not) by the fabrication process. In some embodiments, the fabricability constraint model may provide a per-voxel fabricability metric that may be coalesced to a scalar (e.g., via max or mean reduction) for the physical device to form the fabricability metric.

Figure 4B:
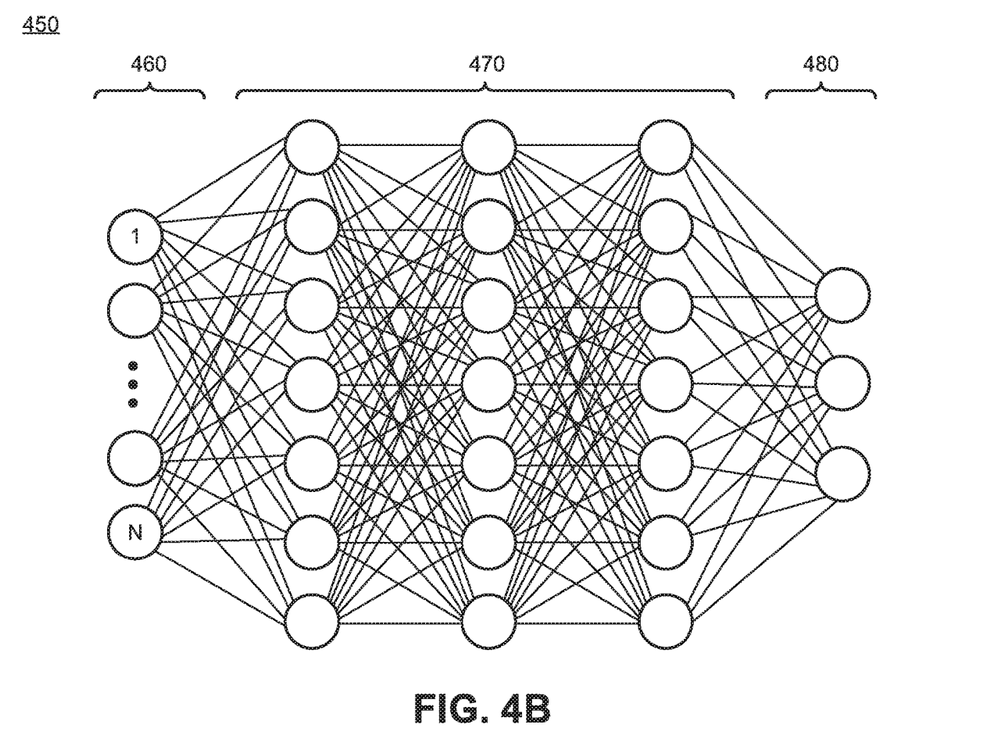
FIG. 4B illustrates one embodiment of a topography of a machine learning model with a feed-forward deep neural network, in accordance with an embodiment of the present disclosure.

FIG. 4B illustrates one embodiment of a topography of a machine learning model 450 with a feed-forward deep neural network, in accordance with an embodiment of the present disclosure. Machine learning model 450 is a feed-forward deep neural network, which is one possible type of neural network that may be implemented for generator 432 and/or discriminator 438 illustrated in FIG. 4A. As illustrated, machine learning model 450 includes nodes organized into an input layer 460, an output layer 480, and multiple hidden layers 470. The number of nodes in each of the input layer 460, hidden layers 470, and output layer 480 is dependent on the particular implementation (i.e., discriminator or generator), among other things. In some embodiments, the number of input nodes is related to an overall resolution of the input design, training data (e.g., data 422 of FIG. 4A and the like), such that each pixel or groups of pixels have a corresponding input node. Similarly, the number of output nodes may be dictated by the function of the machine learning model 450 (e.g., a single output node corresponding to the fabricability score may be sufficient for a neural network corresponding to the discriminator 438 of FIG. 4A). The nodes are interconnected to one another by a series of weights (e.g., the illustrated lines connecting adjacent nodes) and biases which are configured during training and may correspond to parameters of the neural network that may be updated/optimized to teach the machine learning model 450 to distinguish between fabricable structures and non-fabricable structures, for example.

It is appreciated that the type of neural network utilized for machine learning model 450 is highly configurable and dependent on the inputs and target functionality. Thus, in some embodiments, machine learning model 450 may utilize other types or combinations of neural networks including, but not limited to, multi-layer deep convolutional neural networks and the like.

Figure 5:
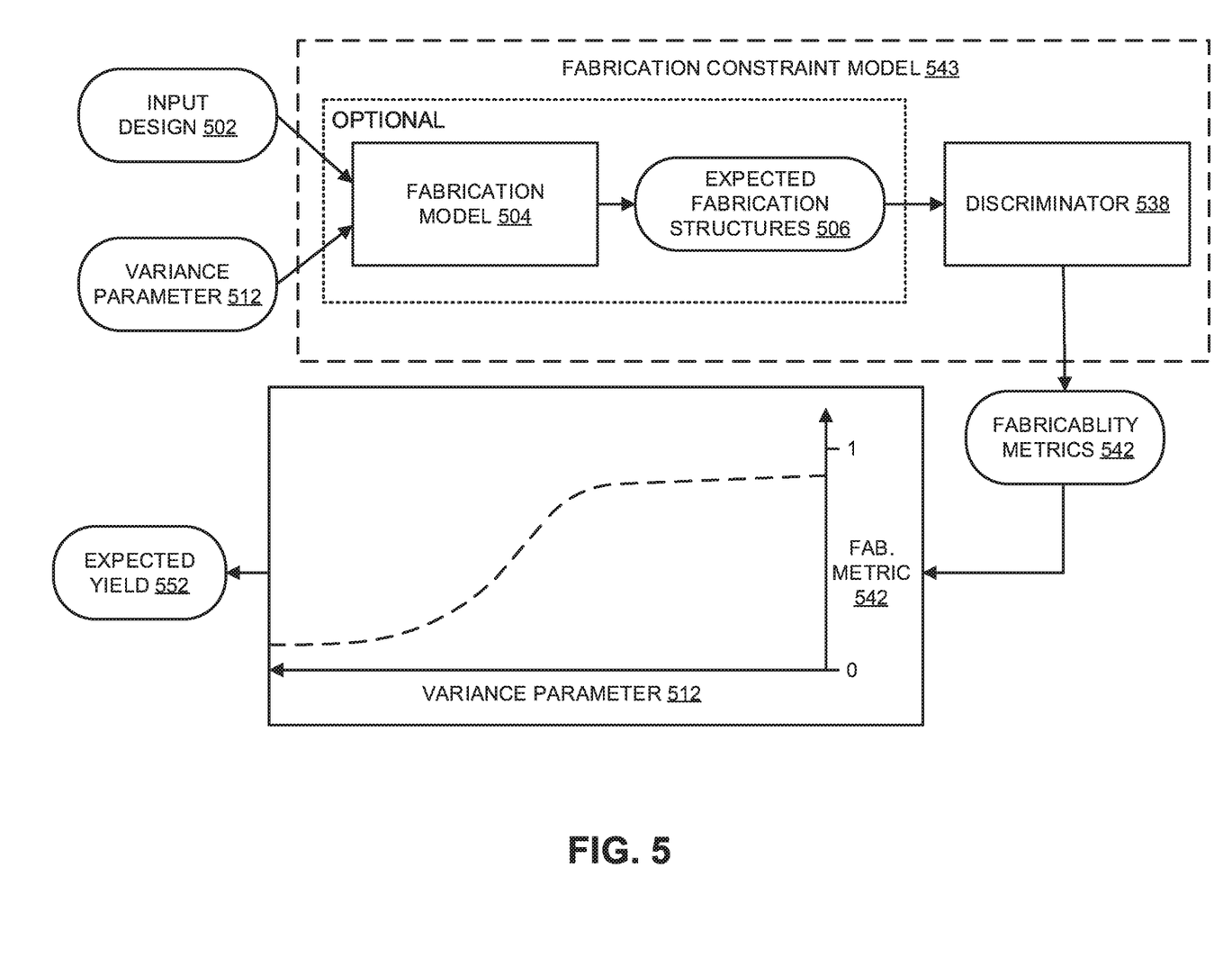
FIG. 5 illustrates a schematic of a fabrication constraint model to determine an expected yield of an input design when the input design is fabricated by a fabrication process, in accordance with an embodiment of the present disclosure.

FIG. 5 illustrates a schematic of a fabrication constraint model 543 to determine an expected yield 552 of an input design 502 when the input design 502 is fabricated by a fabrication process, in accordance with an embodiment of the present disclosure. Fabrication constraint model 543 includes fabrication model 504 and discriminator 538, which may be analogous to their identically named components included in system 100 of FIG. 1, fabrication model 304 in FIG. 3A, and discriminator 438 in FIG. 4A. In other words, fabrication constraint model 543 is one possible implementation of fabrication constraint model 143 illustrated in FIG. 1, and may include the same or similar features, structures, characteristics, or combination thereof in accordance with embodiments of the disclosure.

In the illustrated embodiment of FIG. 5, fabrication constraint mode 543 is trained to model the fabrication constraints of a fabrication process. More specifically, fabrication constraint model 543 receives an input 502 of an input design (e.g., an initial description of a physical device to be fabricated by a fabrication process) and generates a plurality of expected fabrication structures 506 that are associated with a variance of the fabrication process determined by the fabrication model 504 of the fabrication constraint model 543. The expected fabrication structures 506 may correspond to post-fabrication structures (e.g., images) of the resultant structure when the input design 502 is fabricated with the fabrication process. The output of a specific one of the expected fabrication structures 506 associated with the variance (e.g., design variance) of the fabrication process may be selected via variance parameter 512, or in the illustrated case, the variance parameter 512 may be swept across a range of values (e.g., between a first and second threshold such as a min and max value) to output the plurality of expected fabrication structures 506. Each of the plurality of expected fabrication structures 506 may then be input into discriminator 538 to generate a plurality of interim fabricability metrics 542, each associated with a corresponding one of the expected fabrication structures 506. The fabricability metric is related to a probabilistic certainty that a particular one of expected fabrication structures 506 is fabricable with the fabrication process. The expected yield of the input design 502 may then be determined based on the relationship between the plurality of interim fabricability metrics 542 and the variance parameter 512. For example, by taking the integral of the plurality of interim fabricability metrics 542 with respect to the variance parameter 512 (or number of expected fabrication structures 506) one may be able to extract the expected yield of the input design 502 when fabricating the input design 502 via the fabrication process.

It is appreciated that in some embodiments, depending on how discriminator 538 is trained, fabrication model 504 may not be necessary. In one embodiment, discriminator 538 is trained to receive input design 502 (rather than an expected fabrication structures 506) and subsequently output a fabricability metric based on the fabrication constraints of the fabrication process. Similarly, in some embodiments, variance parameter 512 may not be necessary, and rather the same input design 502 may be repeatedly input into the fabrication constraint model 543, which may intrinsically output fabricability metrics 542 that deviate based on the variance of the fabrication process.

Figure 6:
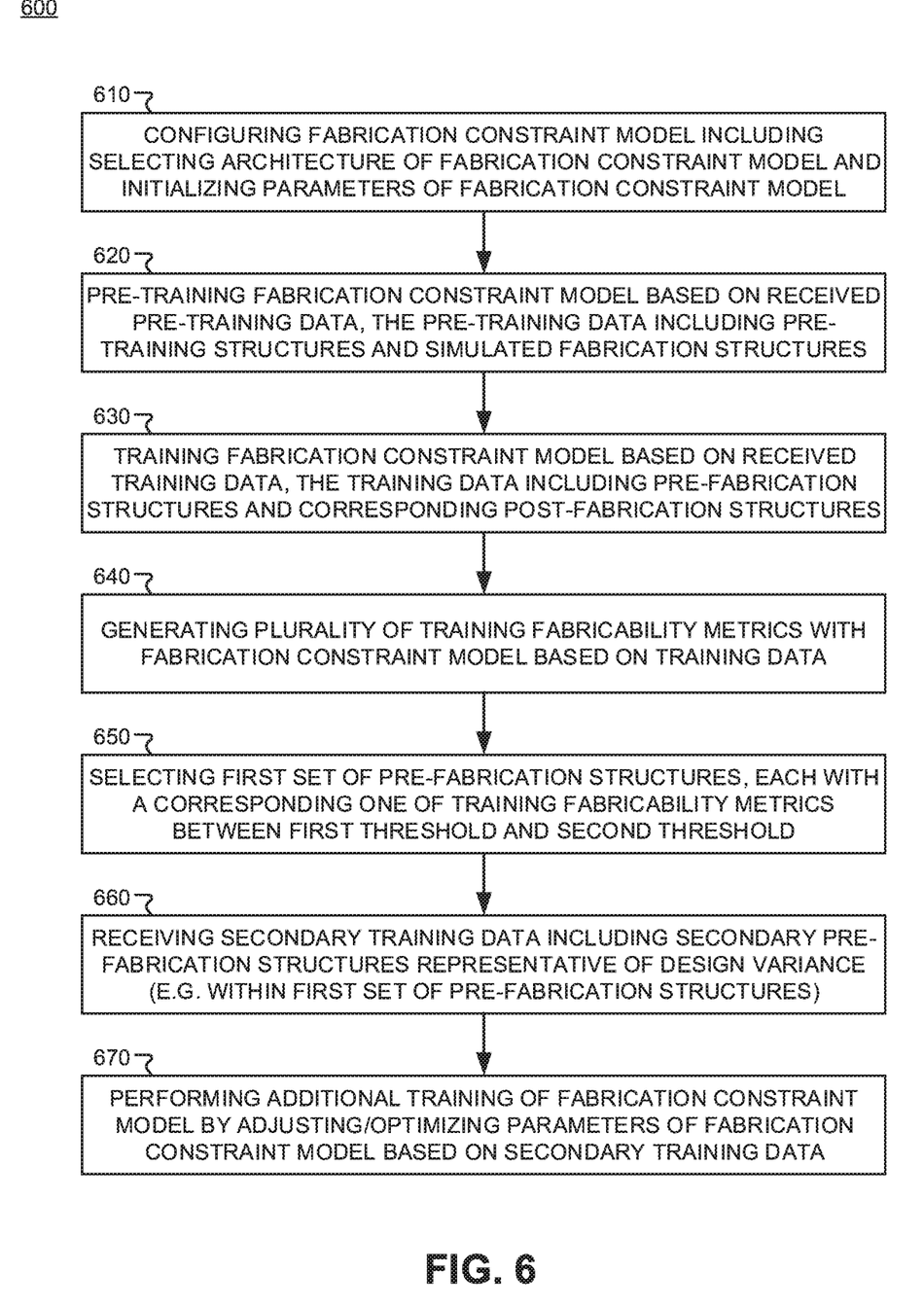
FIG. 6 illustrates a method for configuring and training a fabrication constraint model for modeling fabrication constraints of a fabrication process, in accordance with an embodiment of the present disclosure.

FIG. 6 illustrates a method 600 for configuring and training a fabrication constraint model for modeling fabrication constraints of a fabrication process, in accordance with an embodiment of the present disclosure.

Block 610 shows configuring a fabrication constraint model including selecting an architecture of the fabrication constraint model and initializing parameters of the fabrication constraint model. In some embodiments, the architecture of the fabrication constraint model may include a fabrication model and an inverse fabrication model. The fabrication model may be designed to receive input designs and output an expected fabrication structure representative of the input design fabricated by the fabrication process. The inverse fabrication model is coupled to the fabrication model to receive the expected fabrication structure and output a refined design representative of the expected fabrication structure. In other words, the refined design will more closely match the fabrication constraints or limits of the fabrication process than the input design. In the same or other embodiments, the fabrication constraint model may include a deep neural network, such as a generative adversarial network. In one embodiment, the inverse fabrication model is a generative adversarial network. The generative adversarial network may include a discriminator to output a classification of the input design as fabricable or not fabricable with the fabrication process, which may subsequently be used to determine a fabricability metric of the input design. Parameters of the fabrication model (e.g., weights and biases of the neural network) may be initialized (e.g., set to a random value) during process block 601.

Block 620 illustrates pre-training the fabrication constraint model based on received pre-training data. The pre-training data includes pre-training structures and corresponding simulated fabrication structures. The simulated fabrication structures are generated by a fabrication process simulator, which may correspond to the fabrication model, in response to receiving the pre-training structures. The fabrication constraint model is pre-trained by optimizing the parameters (e.g., weights and biases of the neural network via an optimization algorithm such as gradient descent) based on the pre-training data. The fabrication process simulator may be a numerical simulation software package that generates simulated images corresponding to expected fabrication structures. In some embodiments, the pre-training data (or other training data) may include various test structures (e.g., crosses, circles, lines, etc.) in varying scales to determine initial fabrication constraints of the fabrication process. It is appreciated that the term "pre-training" specifies that the fabrication constraint model may be initially trained with simulated data (e.g., expected fabrication structures from a fabrication processor simulator). In some embodiments, the simulated data utilized for pre-training may sufficiently train the fabrication constraint model to generate fabricability metrics. However, in other embodiments, additional data may be utilized to further train and refine the fabrication constraint model.

Block 630 shows training the fabrication constraint model based on received training data. The training data includes pre-fabrication structures and corresponding post-fabrication structures. The pre-fabrication structures are each representative of target designs and the post-fabrication structures are representative of expected structures when the pre-fabrication structures are fabricated by the fabrication process. The fabrication constraint model is trained by further optimizing the parameters (e.g., weights and biases of the neural network via an optimization algorithm such as gradient descent) based on the training data to model the fabrication constraints of the fabrication process. The fabrication constraint model is trained to generate a fabricability metric of an input design that is related to a probabilistic certainty that the input design is fabricable by the fabrication process determined by the fabrication model. In other words, the fabrication constraint model is trained to distinguish between features that are fabricable and not fabricable with the fabrication process.

Block 640 illustrates generating a plurality of training fabricability metrics with the fabrication model based on the training data. More specifically, the training fabricability metrics represent a degree of confidence or certainty that the fabrication constraint model thinks the input designs of the training data are fabricable.

Block 650 illustrates selecting a first set of pre-fabrication structures, each associated with a corresponding one of the training fabricability metrics between a first threshold and a second threshold. The first and second threshold may correspond to a range of values in which the fabrication constraint model is relatively uncertain that the input designs are fabricable or not fabricable (e.g., the first and second threshold may respectively correspond to 0.25 and 0.75, when 0 represents non-fabrication and 1 represents fabricable). In other words, the fabrication constraint model is probed to expose areas (i.e., structures) in which it is uncertain in regards to fabricability.

Block 660 shows receiving secondary training data including secondary pre-fabrication structures that represent design variance within the first set of pre-fabrication structures. In some embodiments, the secondary training data may also include post-fabrication structures of the secondary pre-fabrication structures. In other words, the secondary pre-fabrication structures may be physically fabricated via the fabrication process and imaged (e.g., via scanning electron microscopy) and used as secondary training data for the fabrication constraint model to augment the training data to better model the fabrication constraints of the fabrication process. In the same or other embodiments, the gradients of the trained fabrication constraint model may be followed or otherwise used to find "uncertain" structures. Specifically, when starting with a random design (e.g., an initial design), the gradients of the differential fabrication constraint model may be determined, and those with larger values (e.g., higher uncertainty) may be used to determine the uncertain structures, which may subsequently be fabricated for generating secondary training data. In other words, the secondary training data may not necessarily have an explicit relationship to the first set of training data. Additionally, in some embodiments, the first set of pre-fabrication structures (e.g., training data) may also be determined or otherwise selected in a similar manner to determine "uncertain structures" (e.g., via gradient descent).

Block 670 illustrates performing additional training of the fabrication constraint model by adjusting/optimizing parameters of the fabrication constraint model based on the secondary training data. The parameters of the fabrication constraint model (e.g., weights and biases of the neural network) are further optimized via an optimization algorithm such as gradient descent based on the secondary training data to model the fabrication constraints of the fabrication process.

Figure 7:
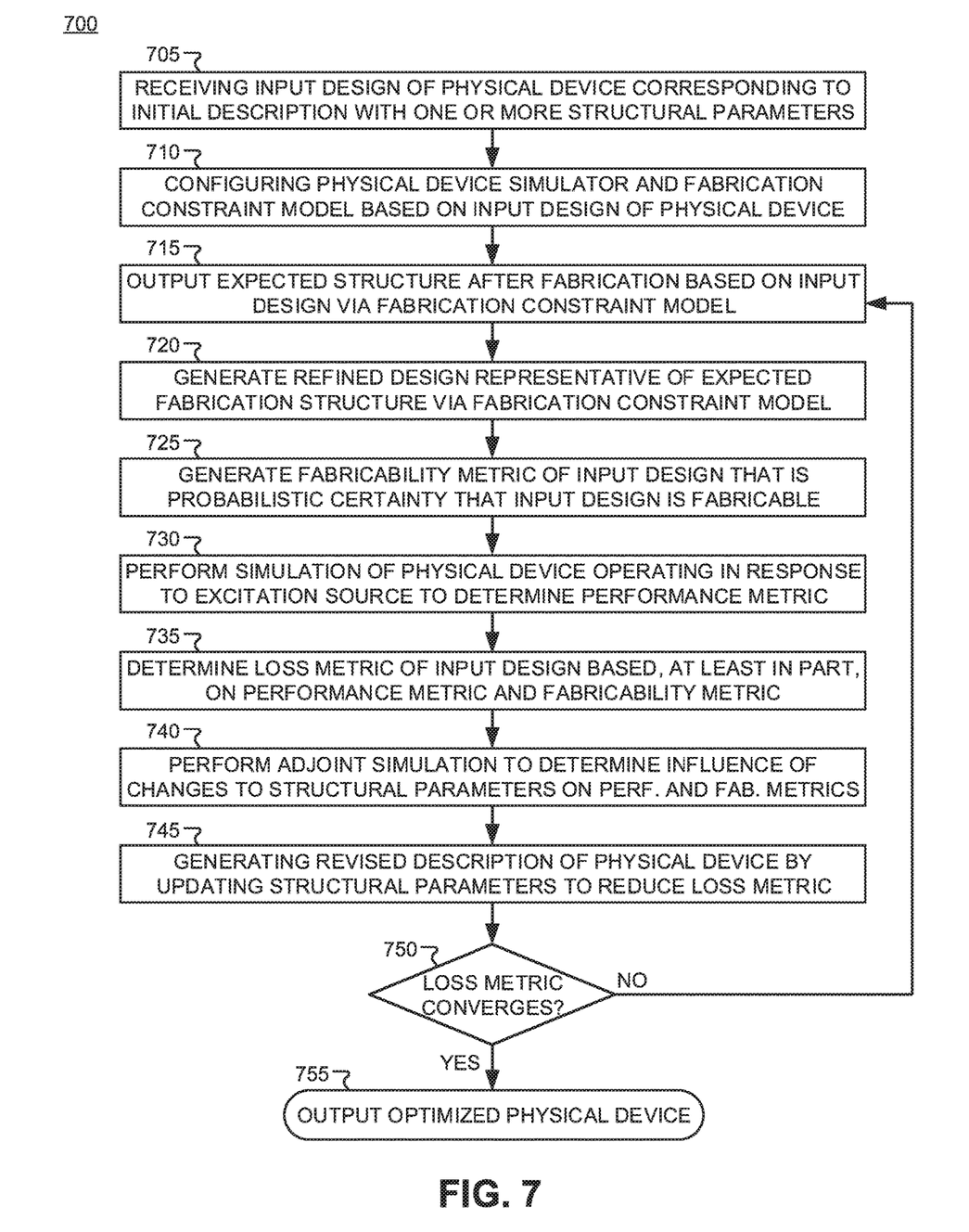
FIG. 7 illustrates a method for optimizing structural parameters of a physical device based, at least in part, on a performance metric and a fabricability metric, in accordance with an embodiment of the present disclosure.

FIG. 7 illustrates a method 700 for optimizing structural parameters of a physical device based, at least in part, on a performance metric and a fabricability metric, in accordance with an embodiment of the present disclosure.

Block 705 illustrates receiving an input design of the physical device. The input design corresponds to an initial description of the physical device defined by one or more structural parameters. In one embodiment, the physical device is described via a plurality of voxels within a simulated environment. Each of the plurality of voxels may be associated with a structural value to describe the structural parameters of the physical device (e.g., the structural value may correspond to permittivity and changes in permittivity within the simulated environment may correspond to geometric or material boundaries of the physical device). In some embodiments, each of the voxels may also be associated with a field value to describe a field response (e.g., electric and magnetic fields) and a source value to describing an excitation source. In one embodiment, the simulated environment includes a design region that includes a portion of the plurality of voxels which have structural values that may be updated, revised, or otherwise changed to update the structural parameters of the physical device.

Block 710 shows configuring the physical device simulator and fabrication constraint model based on the input design of the physical device. For example, depending on the type of physical device the fabrication process (and thus fabrication constraint model) may change. The configuration may include selecting a group of pre-trained fabrication constraint models, adjusting values (e.g., structural value, field value, and/or source value) of the plurality of voxels to configure the simulated environment based on the input design, determining performance and loss metrics of the physical device, and the like.

Block 715 illustrates outputting an expected structure (i.e., post-fabrication) of the input design via a fabrication constraint model. The expected structure may correspond to a simulated image of the input design that is expected to be produced after fabricating the input design via the fabrication process.

Block 720 shows generating a refined design representative of the expected fabrication structure via the fabrication constraint model. The refined design may correspond to a similar image type (e.g., computer-aided design file) as the input design, such that the input design and the refined design may be compared. In some embodiments, the comparison between the input design and refined design is used to determine a fabricability metric of the input design (e.g., based on feature differences between the input design and the refined design).

Block 725 illustrates generating a fabricability metric of the input design via the fabrication constraint model. The fabricability metric is related to a probabilistic certainty that the input design is fabricable by the fabrication process. In other words, the fabricability metric provides a score based on the fabrication constraints of the fabrication process.

Block 730 shows performing a simulation of the physical device operating in response to an excitation source to determine a performance metric of the physical device. The performance metric is based, at least in part, on the input design of the physical device and the excitation source. The simulation of the physical device may correspond to an operational simulation in which a FDTD method is utilized to simulate operation of the physical device in response to the excitation source. During the simulation values (e.g., field, source) may be updated or otherwise changed over time based on the input design of the physical device. In some embodiments, the physical device is an optical waveguide and the excitation source originates at an input region of the plurality of voxels corresponding to an input port of the optical waveguide. In the same or other embodiments, the performance metric may correspond to a power and/or output mode of one or more output ports of the optical waveguide being simulated.

Block 735 illustrates determining a loss metric of the input design based, at least in part, on the performance metric and the fabricability metric. For example, a loss function may be defined that relates the fabricability metric with the performance metric. In one embodiment, the loss metric may correspond to the difference between a target performance value and the performance metric multiplied by the fabricability metric.

Block 740 shows performing an adjoint simulation to determine the influence of changes to structural parameters on the performance and fabricability metrics. In other words, the loss metric is backpropagated through the simulated environment as a virtual or adjoint source that originates within the simulation environment at the locations corresponding to the performance metric (e.g., the output ports of the optical waveguide). The adjoint simulation is a reverse simulation that is used to determine the contribution of changes to the structural parameters on the loss metric for each of the plurality of voxels. When performing the adjoint simulation, a change in the field values is incrementally updated over time for each of the plurality of voxels in response to the adjoint source (e.g., loss response). The change in the loss response based on the loss metric corresponds to a loss gradient that may be combined with the field gradient (e.g., change in the field response with respect to the excitation source) to determine a structural gradient of the physical device. The structural gradient is indicative of how changes in the structural parameters of the physical device influence the loss metric. In other words, the structural parameters may be updated to reduce the loss metric and generate a revised description of the physical device. Since the loss metric is based on both the performance metric and the fabricability metric, the revised description takes into account both the fabricability of the design as well as the performance.

Block 745 illustrates generating a revised description of the physical device by updating the structural parameters to reduce the loss metric. In some embodiments, the revised description is generated by utilizing an optimization scheme after a cycle of operational simulation and adjoint simulation via a gradient descent algorithm.

Block 750 illustrates determining whether the loss metric substantially converges such that the loss metric is below a threshold value (or within a threshold range). Iterative cycles of successively determining the fabricability metric (e.g., of the input design and/or revised description), performing the operational simulation, performing the adjoint simulation, and adjusting the structural parameters (e.g., optimization) to reduce the loss metric are performed repeatedly until the loss metric is reduced to be within the threshold range. In other words, process blocks 715-745 may be iteratively repeated until the loss metric converges.

Block 750 illustrates outputting an optimized physical device in which the structural parameters have been updated to reduce the loss metric such that the loss metric converges to be below a threshold value or threshold range (or otherwise is not able to be further reduced, such as a local minima and/or global minimum).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for optimizing a design of a physical device, the method comprising:
   receiving an input design of the physical device corresponding to an optical or electromagnetic device, wherein the input design is an initial description of the physical device defined by structural parameters;
   performing a simulation of the physical device operating in response to an excitation source to determine a performance metric of the physical device based on the input design of the physical device and the excitation source;
   generating a fabricability metric of the input design via a fabrication constraint model, wherein the fabricability metric is related to a probabilistic certainty that the input design is fabricable by a fabrication process, wherein generating the fabricability metric comprises:
   generating a simulated post-fabrication image representative of the input design fabricated by the fabrication process by inputting the input design into a fabrication model included in the fabrication constraint model; and
   inputting the post-fabrication image into a neural network included in the fabrication constraint model to generate the fabricability metric, wherein the neural network is trained to classify the input design as fabricable or not fabricable with the fabrication process;
   determining a loss metric of the input design based on a loss function that incorporates the performance metric and the fabricability metric;
   performing an adjoint simulation by backpropagating the loss metric through a simulated environment as an adjoint source to determine a contribution of changes to the structural parameters on the loss metric;
   generating a revised description of the physical device by updating the structural parameters to reduce the loss metric based on the contribution of changes; and
   fabricating the physical device based on the revised description using the fabrication process.

2. The method of claim 1, further comprising:
   generating a plurality of expected fabrication structures with the fabrication constraint model based on the revised description of the physical device, wherein the plurality of expected fabrication structures are associated with a variance determined by the fabrication constraint model when the physical device is fabricated with the fabrication process;
   generating a plurality of interim fabricability metrics with the fabrication constraint model based on the plurality of expected fabrication structures; and
   determining an expected yield of the physical device described by the revised description when fabricating the physical device via the fabrication process based on the plurality of interim fabricability metrics.

3. The method of claim 1, wherein the fabrication constraint model includes a generative adversarial network.

4. The method of claim 3, wherein the generative adversarial network includes a discriminator corresponding to the neural network to output a classification of the input design as fabricable or not fabricable with the fabrication process, and wherein the fabricability metric is based, at least in part, on the classification of the input design by the discriminator.

5. The method of claim 1, wherein the initial description of the physical device is described in a context of the simulated environment including a plurality of voxels, and wherein each of the plurality of voxels is associated with a structural value to describe the structural parameters of the physical device.

6. The method of claim 1, further comprising:
   receiving training data including pre-fabrication structures representative of target designs and post-fabrication images representative of the target designs physically fabricated by the fabrication process; and
   training the neural network included in the fabrication constraint model by optimizing parameters of the neural network based on the training data to model fabrication constraints of the fabrication process.

7. The method of claim 6, further comprising:
   receiving pre-training data including pre-fabrication designs and simulated images representative of the pre-fabrication designs physically fabricated with the fabrication process; and
   pre-training the neural network with the pre-training data.

8. A computer-implemented method for training a neural network included in a fabrication constraint model to model fabrication constraints of a fabrication process, the computer-implemented method comprising:
- receiving pre-training data including pre-fabrication designs and simulated images representative of the pre-fabrication designs physically fabricated with the fabrication process;
- pre-training the neural network with the pre-training data;
- receiving training data including pre-fabrication structures representative of target designs and post-fabrication images representative of the target designs physically fabricated by the fabrication process;
- training the neural network with the training data after the pre-training;
- selecting a first set of the pre-fabrication structures and the post-fabrication images included in the training data that the neural network indicates uncertainty for fabricability; and
- training the neural network with the first set of the pre-fabrication structures and the post-fabrication images after the training of the neural network with the training data.

9. The computer-implemented method of claim 8, wherein the first set is determined by generating a plurality of training fabricability metrics output by the neural network in response to receiving the training data, wherein the first set of the pre-fabrication structures and the post-fabrication images included in the training data having corresponding training fabricability metrics between a first threshold and a second threshold.

10. The computer-implemented method of claim 8, wherein the target designs described by the training data includes fabricable structures and non-fabricable structures.

11. The computer-implemented method of claim 8, wherein the neural network outputs a fabricability metric representative of a probabilistic certainty that an input design is fabricable by the fabrication process.

12. The computer-implemented method of claim 11, wherein the fabrication constraint model further includes a fabrication model configured to output a plurality of expected fabrication structures in response to the input design, the plurality of expected fabrication structures corresponding expected post-fabrication images when the input design is fabricated with the fabrication process.

13. The computer-implemented method of claim 12, further comprising:
- generating a plurality of interim fabricability metrics for the plurality of expected fabrication structures using the neural network, wherein the plurality of interim fabricability metrics is indicative of whether individual designs within the plurality of expected fabrication structures are fabricable or non-fabricable; and
- determining an expected yield of the input design when fabricating the input design via the fabrication process based on the plurality of interim fabricability metrics.

14. The computer-implemented method of claim 8, wherein the fabrication constraint model includes generative adversarial network, and wherein a discriminator included in the generative adversarial network corresponds to the neural network.

15. The computer-implemented method of claim 14, wherein the generative adversarial network further includes a generator, and wherein the target designs described include fabricable structures and non-fabricable structures, and wherein during the training of the fabrication constraint model the generator and the discriminator are alternately trained with an adversarial loss and the training data, and wherein the training teaches the discriminator to distinguish between the fabricable structures and the non-fabricable structures.

16. A computer-implemented method for modeling fabrication constraints of a fabrication process, the computer-implemented method comprising:
- receiving paired training data including pre-fabrication structures and corresponding post-fabrication structures representative of the pre-fabrication structures fabricated by the fabrication process, wherein the pre-fabrication structures includes fabricable and non-fabricable structures;
- training a neural network with the training data to configure the neural network to output a fabricability metric in response to receiving an input design, wherein the fabricability metric is related to a probabilistic certainty that the input design is fabricable by the fabrication process;
- generating a plurality of training fabricability metrics with the training data using the neural network;
- selecting a first set of the pre-fabrication structures based on the plurality of training fabricability metrics, each of the pre-fabrication structures included in the first set having a corresponding one of the training fabricability metrics between a first threshold and a second threshold, wherein the first threshold and the second threshold correspond to a range of values in which the fabrication constraint model is uncertain as to whether the first set of the pre-fabrication structures are fabricable or unfabricable;
- receiving secondary training data including a plurality of secondary pre-fabrication structures, wherein the secondary pre-fabrication structures represent design variance identified from the first set of pre-fabrication structures; and
- performing additional training of the fabrication constraint model with the secondary training data to further optimize the neural network to model the fabrication constraints of the fabrication process.

* * * * *